United States Patent [19]

Hilton

[11] Patent Number: 4,968,334
[45] Date of Patent: Nov. 6, 1990

[54] REMOTELY-CONTROLLED MULTI-PORT VALVE HAVING A MULTI-VANE ROTATING CENTRAL DRUM ELEMENT

[76] Inventor: Thomas J. Hilton, 11414 - 105th Pl., NE., Kirkland, Wash. 98033

[21] Appl. No.: 404,690

[22] Filed: Sep. 8, 1989

[51] Int. Cl.$^5$ ............................................. B01D 53/04
[52] U.S. Cl. ........................................ 55/179; 55/162; 55/387; 137/625.32; 137/625.47
[58] Field of Search .................. 55/161-163, 55/179, 180, 350, 387, 389; 137/625.32, 625.47

[56] References Cited

U.S. PATENT DOCUMENTS

| | | | |
|---|---|---|---|
| 630,124 | 8/1899 | Stage . | |
| 660,011 | 10/1900 | Ezell . | |
| 702,406 | 6/1902 | Cody et al. | 137/625.47 X |
| 1,343,749 | 6/1920 | Reton | 137/625.47 X |
| 2,237,684 | 4/1941 | Moore | 55/162 X |
| 2,821,998 | 2/1958 | Mayhew | 137/625.47 X |
| 2,853,102 | 9/1958 | Walker | 137/625.47 X |
| 2,921,604 | 1/1960 | Zettl | 137/625.47 X |
| 2,996,083 | 8/1961 | Huska | 137/625.47 X |
| 3,040,763 | 6/1962 | Bouvier | 137/625.47 X |
| 3,363,651 | 1/1968 | Boyd | 137/625.32 X |
| 3,868,715 | 2/1975 | Slavin | 137/625.47 X |
| 3,927,693 | 12/1975 | Johnston | 137/625.47 |
| 4,038,054 | 7/1977 | Gräff | 55/179 |
| 4,153,376 | 5/1979 | Neier | 366/298 |
| 4,209,308 | 6/1980 | Blodgett | 55/179 |
| 4,228,197 | 10/1980 | Means | 55/162 X |
| 4,272,265 | 6/1981 | Snyder | 55/179 X |
| 4,285,366 | 8/1981 | Elser | 137/625.32 X |
| 4,465,167 | 8/1984 | Fujioka | 192/3.57 |
| 4,469,494 | 9/1984 | van Weenen | 55/179 |
| 4,480,662 | 11/1984 | Garrels | 137/625.23 |
| 4,520,847 | 6/1985 | Baron | 137/625.43 |
| 4,655,252 | 4/1987 | Krumhansl | 137/625.47 X |
| 4,787,417 | 11/1988 | Windsor, Jr. | 55/179 X |
| 4,877,429 | 10/1989 | Hunter | 55/162 |

FOREIGN PATENT DOCUMENTS

| | | | |
|---|---|---|---|
| 3238969 | 4/1984 | Fed. Rep. of Germany | 55/161 |
| 60-000818 | 1/1985 | Japan | 55/350 |

*Primary Examiner*—Robert Spitzer
*Attorney, Agent, or Firm*—Graybeal, Jensen & Puntigam

[57] ABSTRACT

A valve (10) which includes a valve body (12) having a plurality of ports (32) around the periphery thereof, which open onto a central opening (22). A drum assembly (14) is configured to fit within the opening (22) and is mounted for rotation therein. The drum assembly (14) also includes a plurality of openings (38) around the periphery thereof, which are arranged to be capable of being in registry with the openings (22) in the valve body (12). The drum assembly includes a vane member defining interior passageways connecting the openings (22). An actuator assembly (18) is adapted to rotate the drum assembly (14) within the valve body (12) in response to electrical actuation signals.

11 Claims, 2 Drawing Sheets

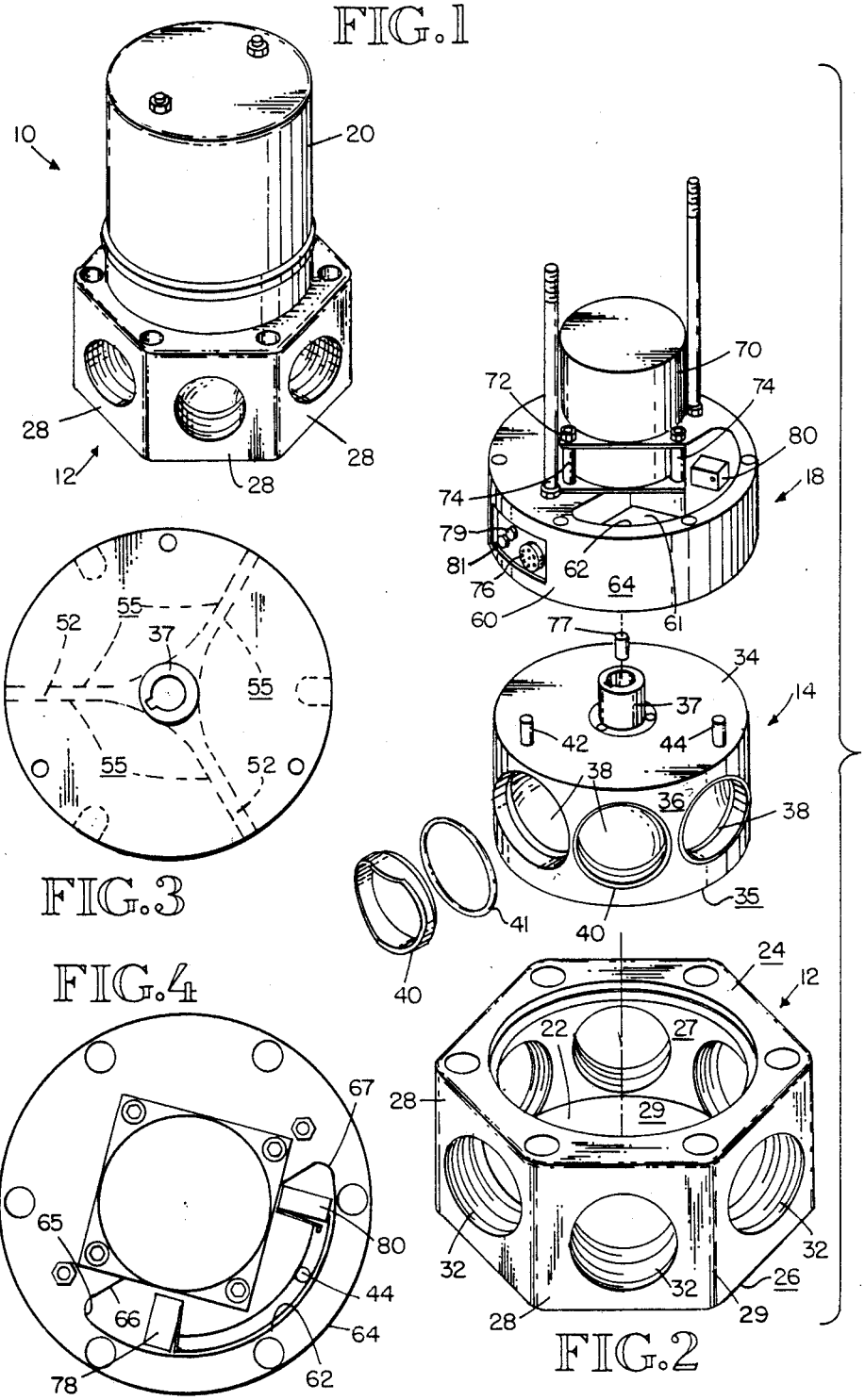
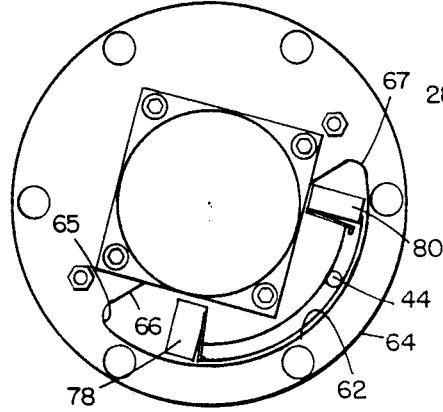

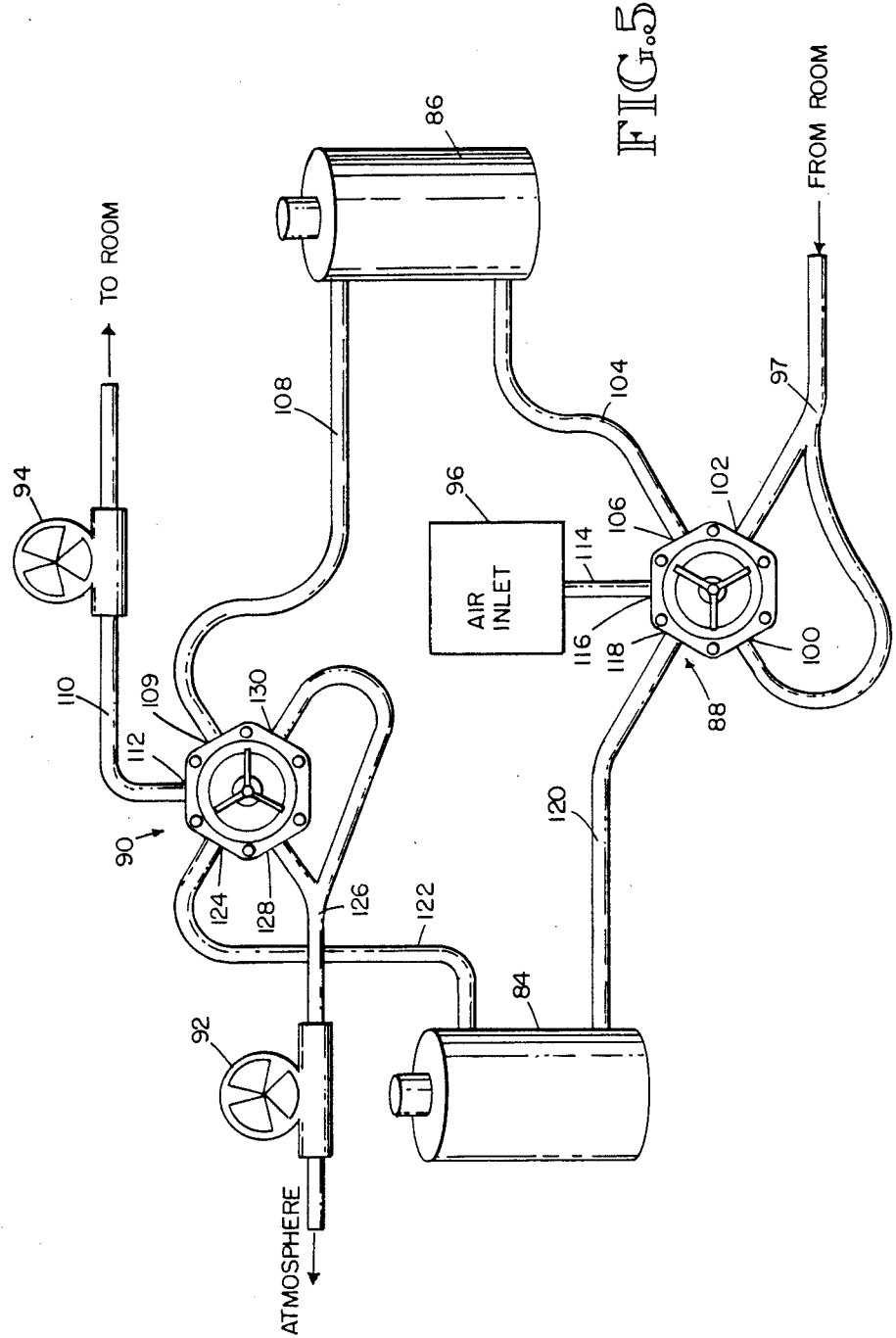

4,968,334

REMOTELY-CONTROLLED MULTI-PORT VALVE HAVING A MULTI-VANE ROTATING CENTRAL DRUM ELEMENT

TECHNICAL FIELD

This invention relates generally to the art of mechanical valves and more specifically concerns a multiple-port rotary valve for controlling fluid movement.

BACKGROUND OF THE INVENTION

Mechanical valves are typically used to control the flow of fluid in controlled atmosphere (CA) systems, and heating, ventilating, and air conditioning systems (HVAC), as well as other applications. In a CA system, $CO_2$, gas is moved from the controlled atmosphere room to a first scrubber tower and then back to the room, while a second scrubber tower is flushed out by air to the atmosphere. Periodically this arrangement will be reversed, with $CO_2$, from the controlled atmosphere room moving through the second scrubber tower and the first scrubber tower being flushed out. Typically, a series of mechanical valves are used to accomplished this.

Other applications involving the control of fluid movement and direction require similar valve arrangements. Heretofore, relatively complex valve systems and/or combinations of valves, typically manually operated, have been used to control the flow of fluid in such applications. Such valve systems, while they do generally accomplish their intended purpose, often are quite complex, expensive, and depend upon an operator, which can lead to errors in the correct fluid flow and the timing of any change in flow.

The valve of the present invention is reliable in operation and capable of automatically changing the direction and destination of fluid flow within a fluid system. The valve is designed so that it is capable of being used without modification in a variety of fluid systems having different flow configurations.

DISCLOSURE OF THE INVENTION

Accordingly, the present invention is a multi-port valve which includes a valve body which has a plurality of ports around the exterior thereof and an internal central opening, wherein the ports are in fluid communication with the central opening, and further includes a drum assembly which has a plurality of openings around the exterior surface thereof and an interior vane member. The drum assembly is positioned within the central opening of the valve body and is mounted for rotation therein. The vane member is arranged relative to the openings in the drum assembly such that in at least one rotational position of said drum assembly, two ports in the valve body are in registry with two openings in the drum assembly which in turn are bordered by portions of the vane member in such a manner that there is fluid communication between said two ports in the valve body.

BRIEF DESCRIPTION OF THE DRAWINGS

FIG. 1 is a perspective view of the valve of the present invention, including its associated actuator.

FIG. 2 is an exploded view of the apparatus of FIG. 1, without the actuator cover.

FIG. 3 is a top plan view of a portion of the valve of FIG. 1.

FIG. 4 is a top plan view of another portion of the valve of FIG. 1.

FIG. 5 is a simplified schematic view of a controlled atmosphere system using the valve of FIG. 1.

BEST MODE FOR CARRYING OUT THE INVENTION

Referring to FIGS. 1 and 2, the present invention is a rotating mechanical valve shown generally at 10. Valve 10 includes a valve body 12, a rotatable drum assembly 14 and an actuator assembly 18 which is enclosed by a cover 20.

The valve body 12 is shown most clearly in FIG. 2. In the embodiment shown, valve body 12 has a central opening 22. Valve body 12 has upper and lower flat surfaces 24 and 26, respectively, bounded by a side surface which comprises six equal size portions 28—28. In the embodiment shown, valve body 12 is 4 inches high and 10 inches across at its widest point. Each of the side surface portions 28 is 5 inches by 4 inches and is substantially flat. Each portion 28 is finished at the end edges thereof, i.e. edge 31, so that adjacent portions 28 round into each other. In the embodiment shown, the valve body 12 is made of aluminum, but could be made from other materials as well.

The interior opening 22 is circular and in the embodiment shown has a diameter of 6 inches and extends 4 inches from the upper surface 24, where it is open, to a bottom internal surface 29. Interior side surface 27 and bottom surface 29 of opening 22 are polished. Communicating with the central opening 22 through each of the side surface portions 28-28 are circular openings 32—32, referred to hereinafter as ports. In the embodiment shown, each port 32 has a diameter of approximately 2½ inches and is threaded so as to provide a secure fluid-tight means of attachment with a conduit (not shown) which is connected to the valve. In the embodiment shown, there are six ports 32, one for each side surface portion 28. However, it should be understood that there could be more ports and/or side portions or fewer ports/side portions than that shown. Also, one or more side portions may not have a port, and hence, it is possible that the ports may not be equally spaced around the periphery of the valve.

Drum assembly 14 is also shown most clearly in FIG. 2. Drum assembly 14 is circular in exterior configuration and includes a circular flat top surface 34 and lower surface 35 and a peripheral wall 36 which extends between the upper and lower surfaces. In the embodiment shown, the peripheral wall 36 is polished and is configured and sized so as to fit into the opening 22 in the valve body 12 and to be freely rotatable therein. Lower surface 35 abuts surface 29 of the valve body 12. Extending through peripheral wall 36 are a series of openings 38—38 which are arranged so as to be in registry therewith when the drum 14 is properly positioned.

Positioned in the peripheral wall 36 about each opening 38 is a sealing member 40, typically made of plastic, which provides a fluid-tight seal between the valve body 12 and the drum assembly 14. Positioned between the sealing member 40 and a lip within the drum 14 about each opening 38 is an O-ring 41 which in effect biases the sealing member outwardly, against the interior surface 27 in the body element 12. When the drum 14 is operatively positioned within opening 22 in valve body 12, the top surface 34 is coplanar with the upper surface 24 of valve body 12.

Drum assembly 14 also includes two cylindrical stubs 42 and 44 which extend a short distance upwardly from top surface 34. In addition, a hollow cylindrical member 37 is secured to the top surface 34 and extends a short distance upwardly to provide a mounting element for the actuator assembly 18 which is described fully below.

FIG. 3 shows a cross section of the interior of the drum 14. The interior has a 3 vane configuration, integral with the remainder of the drum 14. The three vanes 52—52 extend from the peripheral wall 39 to the center of the drum assembly 14. The three vanes 52—52 are equally spaced in the embodiment shown, such that each vane is separated by 120° from its two adjacent vanes. In the embodiment shown, the vertical surfaces 55, respectively, of each vane 52 curve in the horizontal plane as shown into the adjacent vane, but also curves in the vertical plane, so that in effect, the circular configuration of the openings 388 continues through the interior of the drum, without any sharp corners or break points. In the embodiment shown, each adjacent pair of vanes borders two adjacent openings 38—38.

The actuator assembly is shown in FIGS. 2 and 4. The actuator assembly 18 comprises a cylindrical member 60 which is configured to be positioned on the upper surface 24 of valve body 12. In the embodiment shown, member 60 has a diameter of 7¼ inches and is 11¾ inches high. Cylindrical member 60 includes an opening 61 which extends therethrough from top to bottom. Opening 61 has a curved edge 62 which is generally parallel to the peripheral edge surface 64 of cylindrical member 60, and approximately 1 inch therefrom. The curved edge 62 extends for approximately 150° relative to the center of the actuator (FIG. 4), with the respective ends 65, 67 of the curved edge 62 being connected by a straight edge 66. At its widest point, the distance between curved edge 62 and straight edge 66 is approximately 5 inches.

One of the stubs 42 from the drum assembly 14 extends upwardly into the opening 61 in cylindrical member 60. The actuator assembly 18 includes a motor 70 which is supported on a base plate 72 which is in turn supported off the top surface of the cylindrical member 60 by means of spacer bolts 74. Electrical power (115 volts AC) is supplied to the motor through an electrical connection 76. The motor shaft 77 extends down into the mounting element 35 on drum 14 and is keyed thereto, so that rotation of the motor shaft results in rotation of the drum 14 within valve body 12. In the embodiment shown, the drum 14 moves 60° between two specific positions. Neon lights 79 and 81 indicate which position the drum 14 is in.

Limit switches 78 and 80 (FIG. 4), which are positioned in the vicinity of the opposite ends of opening 61, control the operation of the motor 70. As the drum 14 rotates under the control of motor 70, the stub 44 moves within opening 61. When stub 44 contacts either one of the limit switches, the motor will turn off. In the embodiment shown, as briefly explained above, there are thus two positions of the drum within the valve body 12, one position at each end of the range of movement, as defined by the limit switches 78 and 80, which in the embodiment shown is 60°. Additional positions could be provided with a different switch arrangement.

The actuation of the motor 70 can be controlled automatically by signals applied through electrical connection 76. Also, a switch could be installed for manual operation of the motor, if desired. With the above-described structure, the drum assembly 14 may be rotated in an automatic, controlled manner relative to the valve body 12. Different openings 38 may thus be brought into registry with different ports 32 in the valve body, resulting in a change of direction of the fluid moving through the valve through selected ports thereof.

FIG. 5 shows a controlled atmosphere system using the valve of the present invention. The system includes left and right scrubber towers 82 and 86, which are commonly used in such systems to remove oxygen and $CO_2$ from the controlled atmosphere (CA) gas, leaving an atmosphere of nitrogen suitable for controlled atmosphere environments. The system includes two valves 88 and 90 as well as two fans 92 and 94 and an air inlet 96. In the system as shown, a conduit 97 from the controlled atmosphere environment, i.e. the CA storage room where products such as apples are stored, is connected to the first port 100 and the fifth port 102 of valve 88. Conduit 104 connects the fourth port 106 of valve 88 with the bottom of scrubber tower 86. The top of the scrubber tower 86 is connected via conduit 108 to the fourth port 109 of the second valve 90. A conduit 110 connects the third port 112 of valve 90 to fan 94 which moves the resulting nitrogen-rich gas back to the controlled atmosphere room.

Air inlet 96 is connected through conduit 114 to the third port 116 of valve 88, while the adjacent second port 118 is connected via conduit 120 to the bottom of scrubber tower 84. Conduit 122 connects the top of scrubber tower 84 to the second port 124 of valve 90. Conduit 126 connects the first and fifth ports 128 and 130 to fan 92 and from there to the atmosphere.

When the valves 88 and 90 are in the position shown, scrubber tower 86 removes oxygen and $CO_2$ from the gas from the controlled atmosphere room. The resulting nitrogen-rich air is then moved back into the room by fan 94 through valve 90. At the same time, the left scrubber tower 84 is being cleansed by air from inlet 96 through conduit 114, valve 88, and conduit 120. The cleansing air then moves through conduit 122, valve 90, and then through fan 92 to the atmosphere. This cleansing action restores the ability of the scrubber tower 84 to remove $CO_2$ and oxygen from gas applied to it.

For the other sequence, the drum assemblies in valves 88 and 90 are rotated clockwise one position (60.) so that the gas from the CA room now moves into valve 88 through port 100, out through port 118, through scrubber tower 84 into valve 90 through port 124, out through port 112 and then back to the CA room through fan 94. Scrubber tower 86 is purged by air from air inlet 96 through conduit 114, valve 88, conduits 104 and 108, valve 90, and then to the atmosphere through fan 92. The timing of the change in position of the valves is controlled by timing signals applied to the motor 70 through electrical connections 76.

The two-valve, automatically controlled system of FIG. 5 replaces a system of manual valves which are currently used in controlled atmosphere systems. The valve of the present invention results in a simpler, less expensive, and more reliable system. In addition to the controlled atmosphere application, other applications involving periodic changing of the direction or destination of fluid flow can be implemented with the valve of the present invention.

Although a preferred embodiment of the invention has been disclosed herein for illustration, it should be understood that various changes, modifications, and substitutions may be incorporated in such embodiment without departing from the spirit of the invention which is defined by the claims which follow:

What is claimed is:

1. A multi-port valve, comprising:
   a valve body, having a plurality of ports around the exterior thereof and an internal central opening defining an interior surface, wherein said ports are in fluid communication with the central opening; and
   a drum assembly having a plurality of openings around the exterior surface thereof and an interior vane member, the drum assembly being positioned within the central opening of the valve body and mounted for rotation therein, wherein the vane member is arranged relative to the openings in the drum assembly such that in at least one rotational position of said drum assembly, two ports in the valve body are in registry with two openings in the drum assembly which in turn are bordered by portions of the vane member in such a manner that there is fluid communication between said two ports in the valve body.

2. An apparatus of claim 1, wherein the drum assembly is in fluid-tight sealing contact with the interior surface of said valve body.

3. An apparatus of claim 1, including means for moving the drum assembly between at least two selected positions.

4. An apparatus of claim 3 wherein the moving means includes an actuator which is positioned above said drum assembly and which includes a motor, responsive to electrical signals, for rotating the drum assembly between at least two selected positions.

5. An apparatus of claim 4, wherein the drum assembly includes two post-like elements which extend upwardly from the top surface thereof, one of said post-like elements being positioned within an opening in the actuator, wherein the actuator includes switches at selected positions within the opening in the line of movement of said one post-like element as the drum assembly rotates beneath the actuator, and wherein the actuator includes means terminating the operation of the motor when one of the switches is contacted by said one post-like element.

6. An apparatus of claim 1, wherein each of the openings in the drum assembly includes a sealing means therearound for fluid-tight contact with the interior surface of the central opening in the valve body, the sealing means including a sealing element and an O-ring for biasing the sealing element slightly outwardly from the drum assembly.

7. An apparatus of claim 1, wherein the valve body includes five ports spaced around the periphery thereof and the drum assembly includes six equally spaced openings.

8. An apparatus of claim 7, wherein the valve body has six sides of substantially equal dimensions, and wherein five of the six sides includes a port centrally positioned therein.

9. An apparatus of claim 1, wherein the vane member within the drum assembly is configured to define interior passageways connecting selected openings in the drum assembly, wherein the passageways are configured in cross section similar to the configuration of the openings.

10. A controlled atmosphere system utilizing at least two multi-port valves, comprising:
    first and second fluid scrubber assemblies;
    first and second multi-port valves, wherein each valve includes a valve body having a plurality of ports around the exterior thereof, which are in fluid communication with an interior opening and a drum assembly positioned therein which in turn has openings therein and vane members defining interior passageways therein, wherein the drum assembly is rotatable in the interior opening of the valve body;
    first conduit means connecting in succession a controlled atmosphere room, the first multi-port valve, the first fluid scrubber, the second multi-port valve and the controlled atmosphere room;
    first fan means moving fluid through the first conduit means;
    second conduit means connecting in succession the first multi-port valve, the second fluid scrubber, the second multi-port valve and the atmosphere;
    second fan means moving fluid through the second conduit means;
    means connecting a source of air to the first multi-port valve;
    wherein the drum assembly in each valve is rotatably controllable such that in one valve position fluid from the controlled atmosphere room moves through the first valve, the first fluid scrubber, the second valve and back to the controlled atmosphere room, while air is moved through the first valve, through the second fluid scrubber, the second valve and then to the atmosphere, while in a second valve position, fluid from the controlled atmosphere room is moved through the first valve, the second scrubber, the second valve and back to the controlled atmosphere room, while air is moved through the first valve, the fluid scrubber, the second valve and to the atmosphere, thus providing for alternate cleansing of the fluid scrubbers and scrubbing of the fluid from the controlled atmosphere room.

11. An apparatus of claim 10, wherein the valve body includes six sides, of substantially equal dimension, and wherein five of said six sides have said ports therein, and wherein the vane member includes three equally spaced vane-like elements, and wherein the valve includes actuation means responsive to electrical signals for automatically moving said drum assembly between said two positions.

* * * * *